United States Patent Office 3,296,158
Patented Jan. 3, 1967

3,296,158
METHOD OF PREPARING LIGNIN REINFORCED RUBBER AND PRODUCT THEREOF
Mitchell S. Dimitri, Westwood, Charleston, S.C., assignor to West Virginia Pulp and Paper Company, New York, N.Y., a corporation of Delaware
No Drawing. Filed Mar. 23, 1961, Ser. No. 97,719
8 Claims. (Cl. 260—17.5)

This invention relates to method of preparing lignin reinforced rubber and to the reinforced rubber obtained thereby.

In U.S. Patent No. 2,608,537 to Pollak, a method of incorporating lignin into rubber by joint precipitation of a mixture of a rubber latex and an aqueous alkali lignin solution was disclosed. By the employment of this coprecipitation process a lignin reinforced rubber could be obtained which was for many purposes equal or superior to carbon black reinforced rubbers. Typical properties of butadiene styrene rubbers reinforced with lignin according to the teaching of Pollak generally have properties within the following ranges.

Modulus, p.s.i. _____ 500–700
Tensile, p.s.i. _____ 2800–3200
Hardness Shore A _____ 70–80
Tear, lbs./in. _____ 300–400
DeMattia flex growth, 1,000 cycles to 0.5 in. __ 80–120
NBS abrasion resistance _____ 90–110

It will be observed that for use as tire treads these rubbers have lower modulus and abrasion resistance and higher hardness than is generally desirable. Subjecting the rubber stock to heat treatment at temperatures above 300° F. has been known to improve these properties. Such heat treatment may be conducted either statically or dynamically, although dynamic heat treatment in such equipment as the Banbury or Shaw Intermix is much preferred. The methods and results of this heat treatment employing a highly oxidized lignin are well shown in British Patent 781,019.

Unfortunately, ordinary alkali lignin as precipitated from blank liquor cannot be employed in such a process. Typical recovered kraft pine lignins have fusion temperatures in the range of 350 to 410° F. but tend to coalesce in a rubber system at much lower temperatures, on the order of 250 to 300° F. Heating of a lignin-rubber system above the temperatures at which the lignin coalesces causes the minutely precipitated lignin particles to fuse or gel resulting in reduced reinforcement and a serious decrease in the properties of the finished cured rubber. Other alkali lignins, such as kraft hardwood lignin and soda pine and hardwood lignins, tend to fuse at even lower temperatures than kraft pine lignin and consequently are much more subject to the detrimental effects of coalescing upon heating. For any heat treatment process to be of benefit a lignin must be employed which has greater resistance to heat than that of normally recovered lignins. This fact is well illustrated in the following table which shows the optimum properties obtained upon subjecting a rubber stock containing unmodified kraft pine lignin having a dry fusion temperature of about 210° C. to mastication for 5 minutes in a Banbury. The maximum temperatures obtained in the Banbury in the two separate runs were 313 and 394° F. and at both these temperatures serious fusion of the lignin occurred as evidenced by the extremely low tensile strengths.

It is therefore the primary object of this invention to provide a method for increasing the heat resistance of lignin in a rubber system to such a degree that heat treatment of the rubber stock can be accomplished without fusion of the lignin. Other objects will become evident from the following disclosure.

I have found that if coprecipitation of the lignin and rubber from a mixture of an alkaline solution of lignin and a rubber latex is brought about by the employment of polyvalent metallic salts instead of the customary mineral acid that the lignin in the rubber system which is obtained has a very high resistance to the effects of heat and that the lignin-rubber system can be heated to temperatures well in excess of 300° F. without causing fusion of the lignin. Thus the benefits of increased modulus and abrasion resistance and decreased hardness can be obtained by heat treating the coprecipitate without loss of tensile strength caused by fusion of the lignin. The heat resistance of the lignin in these metallic salt coprecipitates has in fact been found to be so high that heat treatments at temperatures of 400 and even 450° F. will not cause serious fusion of the lignin.

In practice of this invention a mixture of an alkaline solution of lignin and a rubber latex is first prepared in accordance with well known prior practice such as shown in Pollak 2,608,537. This mixture, instead of being added to a solution of a mineral acid according to prior methods, however, is added to an aqueous solution of a polyvalent metallic salt. The metallic salts simultaneously insolubilize the rosin-fatty acid soap holding the rubber in the latex emulsion and forms the metallic salt of lignin. As these metallic salts of lignin are insoluble in water, the rubber and lignin are coprecipiated together to form a slurry of lignin-rubber particles which are further processed in a normal fashion by filtering, drying, heat treating, compounding, and curing.

The coprecipitate particles obtained employing the metallic salts as the precipitating agent are very fine and very difficult to filter. These particles also retain a very high amount of moisture which for removal requires a degree of drying. It is consequently preferred practice to briefly heat the lignin-rubber particles as precipitated and while still in the slurry to a temperature above 212° F. and most preferably to about 250 to 270° F. This heating of the slurry both coagulates and dehydrates the lignin-rubber particles, making filtration much easier and yielding a filter cake of greatly increased solids content.

The heat treatment of the metallic salt coprecipitate may be accomplished either statically or dynamically. Static heat treatment, however, necessarily requires a greater time on the order of 30 minutes or more compared to as little as about 3 minutes required for dynamic heat treatment. Although the very high heat resistance of the metallic salt coprecipitate will permit drying at temperatures of 300° F. or so, the preferred method for conducting the static heat treatment in conjunction with drying is to pass the coprecipitate through an oven in which the first section is maintained at about 220–250° F. to effect drying and in which the second stage is maintained at the desired heat treatment temperature, e.g., 300 to 400° F.

Although any water soluble salt of a polyvalent metal may be employed in this invention, the preferred salts are those of aluminum, magnesium, calcium and zinc. These salts are inexpensive and have little or no effect upon the properties of the rubber. Many of the other usable salts

| Maximum Banbury Temp., ° F. | Cure Time, min. | Modulus, p.s.i. | Tensile, p.s.i. | Hardness Shore A | Cresent Tear, lbs./in. | DeMattia Flex Growth, 1,000 cycles to 0.5 in. | NBS Abrasion Index |
|---|---|---|---|---|---|---|---|
| 313 | 100 | 390 | 1,890 | 63 | 150 | 142 | 66 |
| 394 | 40 | 900 | 1,490 | 63 | 165 | 34 | 107 | such as those of cadmium, lead, tin, cobalt and chromium are relatively expensive and since they do not provide any improved results over the less expensive salts, are less desirable. Some metals such as iron, copper, nickel and cobalt are oxidation catalysts and may promote oxidation of the rubber over a period of time although definite evidence of such catalytic action when the metals are combined with the lignin as the salt has not been found. When certain salts such as those of zinc, magnesium and lead are employed to effect coprecipitation, the subsequent requirement for metal oxide activator during compounding is reduced. Thus the quantity of activator added to the rubber stock may be decreased by an amount up to the equivalent quantity of the salt added to the rubber system during coprecipitation.

The quantity of metallic salt needed to coprecipitate the lignin and latex will vary widely, dependent upon a large number of factors, some of which are not well understood at this time. The only generalization which holds true for all salts and conditions appears to be that enough salt should be employed to cause coprecipitation of essentially all of the lignin and latex. With the very weakly acidic salts such as manganese sulfate, such excessive quantities of salt are required that it is advisable to use a mineral acid in conjunction with the salt to effect coprecipitation. In such cases as this sufficient mineral acid should be employed to reduce the pH of the lignin-latex mixture to about 7.5, or just above the pH at which the lignin and rubber will start to precipitate. The addition of only relatively small quantities of the salt will then cause coprecipitation of the lignin and rubber. The more acidic salts can be employed satisfactorily alone, although in many cases the use of acid to reduce the pH of the lignin-latex mixture will result in considerable economy. The quantity of salt to be employed will vary not only with the particular salt employed but also upon other factors such as the alkalinity of the lignin-latex mixture. The exact quantity of the salt which will cause coprecipitation of the lignin and rubber may best be determined by simple trial and error method. In any event, the quantity of salt required will not be less than 1 equivalent weight of the salt per mole (840 unit weight) of the lignin. In general, it has been found that for most fairly acidic salts such as aluminum sulfate and zinc chloride about 2 to 3 equivalents of the salt will be required per mole of lignin.

The coprecipitation of the lignin with polyvalent salts does not appreciably change the quantity of lignin required for reinforcement. Consequently about 25 to 100 parts by weight of the lignin (exclusive of the weight of the metal) will generally be employed to reinforce 100 parts by weight of rubber. The use of the salt precipitated lignin to produce a highly heat resistant rubber stock will have primary advantage in use with natural and butadiene styrene rubbers which are commonly employed in tire treads although the advantages of increased heat resistance may be obtained employing other butadiene type rubbers which are available in latex form such as chlorobutadiene and acrylonitrile rubbers.

The following examples are presented to illustrate the practice of this invention.

*Example 1*

25 pounds of moist kraft pine sodium lignate, equivalent to 17.1 pounds of precipitable lignin, were added to 16 gallons of water at 190° F. and dissolved therein. This sodium lignate solution was added to 21.5 gallons of a butadiene styrene rubber latex containing 34.2 pounds of rubber solids. This mixture was then added slowly with good mixing to 30 gallons of a salt solution at 180° F. containing about 2.9 pounds of zinc chloride, thereby coprecipitating the lignin and rubber. The resultant slurry was heated briefly to 260° F. by direct steam injection and permitted to cool. The slurry was washed, then filtered and dried at 220° F. 150 parts of the dried coprecipitate were masticated in a Model B Banbury for 2.5 minutes when 10 parts of a coal tar plasticizer, 2 parts stearic acid, 5 parts zinc oxide, and 1 part phenyl-beta-naphthyl amine were added and mastication continued for an additional 2.5 minutes. The maximum temperature reached in the Banbury during mastication was 396° F. The stock was placed on a roll mill at 180° F. and combined with 1.2 parts N cyclohexyl benzothiazol-2-sulfenamide, 0.4 parts diphenyl guanidine, 0.08 part copper dimethyl dithiocarbamate, 1.0 part N-isopropyl-N'-phenyl-P-phenylene diamine, and 2 parts sulfur after which it was sheeted out. The stock was cured at 287° F. for 30, 40, and 60 minutes and the properties determined according to ASTM methods for testing of rubber. The following are the results obtained.

| Cure Time, min. | Modulus, p.s.i. | Tensile, p.s.i. | Elong., percent | Hardness Shore A | Cresent Tear, lbs./in. | DeMattia Flex Growth, in. at 2,000 kc. | Goodrich Heat Build-up, ° F. | NBS Abrasion Index |
|---|---|---|---|---|---|---|---|---|
| 30 | 1,330 | 3,280 | 630 | 66 | 485 | | | |
| 40 | 1,400 | 3,400 | 600 | 66 | 550 | 0.40 | 89 | 156 |
| 60 | 1,480 | 3,580 | 600 | 66 | 605 | | | |

A similar rubber stock was prepared using zinc chloride for coprecipitating the lignin and rubber, however, this stock was broken down on a roll mill and not subjected to a high temperature heat treatment. Testing of this rubber stock yielded the following results which should be compared with the heat treated stock.

| Cure Time, min. | Modulus, p.s.i. | Tensile, p.s.i. | Elong., percent | Hardness Shore A | Cresent Tear, lbs./in. |
|---|---|---|---|---|---|
| 30 | 660 | 3,230 | 760 | 78 | 400 |
| 40 | 700 | 3,290 | 720 | 78 | 400 |

*Example 2*

A run similar to that of Example 1 was made employing an oil extended high Mooney butadiene styrene rubber latex. This latex was extended with 37.5 parts of oil per 100 parts of rubber solids. 50 parts of lignin were employed to produce a 50 loading rubber based on the oil and rubber solids or a 68.8 loading based on rubber solids alone. Similar procedure to that used in Example 1 was employed except that the slurry was not heated after coprecipitation. The physical properties of the rubber were determined to be as follows:

| Cure Time, min. | Modulus, p.s.i. | Tensile, p.s.i. | Elong., percent | Hardness Shore A | Cresent Tear, lbs./in. | Goodrich Heat Build-up, ° F. | NBS Abrasion Index |
|---|---|---|---|---|---|---|---|
| 40 | 480 | 2,700 | 740 | 66 | 485 | 45 | 117 |
| 60 | 760 | 2,900 | 680 | 68 | 415 | 39 | 133 |
| 75 | 810 | 3,140 | 680 | 70 | 420 | | |

Example 3

500 grams of moist kraft pine sodium lignate, equivalent to 348 grams of precipitable lignin, were added to 2000 ml. of water at 200° F. and dissolved therein. 3540 grams of a butadiene-styrene rubber latex containing 700 grams of rubber solids were mixed with the lignin solution and the lignin and rubber in the resultant mixture coprecipitated by adding the mixture slowly with agitation to a solution of 230 grams of magnesium sulfate $$(MgSO_4 \cdot 7H_2O)$$

in 4000 ml. of water. The coprecipitate was filtered, washed and dried, and compounded and cured in the manner shown in Example 1. The cured rubber possessed very similar properties to that shown in Example 1.

Example 4

A lignin-latex mixture was prepared according to Example 3. The lignin and rubber were coprecipitated from the mixture by slowly adding it to a solution of 230 grams of $CaCl_2$ dissolved in 4000 ml. of water. Further processing according to the procedures of Example 3 yielded a cured rubber product very similar in properties of Example 1.

While this invention has been illustrated in connection with several specific examples, it is understood that the practice of this invention may be varied widely within the scope of the principles set forth hereinabove and of the appending claims.

I claim:

1. A butadiene type rubber stock which has been subjected to a heat treatment at a temperature above 300° F. comprising 100 parts of rubber stock and from about 25 to 100 parts of lignin in the form of a polyvalent metal lignate.

2. The rubber stock of claim 1 wherein the lignin is in the form of an aluminum lignate.

3. The rubber stock of claim 1 wherein the lignin is in the form of a zinc lignate.

4. The rubber stock of claim 1 wherein the lignin is in the form of a calcium lignate.

5. The rubber stock of claim 1 wherein the lignin is in the form of a magnesium lignate.

6. The method which comprises effecting coprecipitation of lignin and butadiene type rubber from a mixture of an aqueous alkaline solution of lignin and a rubber latex by addition of the mixture to an aqueous solution of a polyvalent metallic salt, separating the supernatant liquid from the thus coprecipitated lignin-rubber, drying the coprecipitated lignin-rubber and subjecting the dried lignin-rubber to a heat treatment above 300° F.

7. The method of claim 6 wherein the lignin-rubber is subjected to mastication when being heated to above 300° F.

8. The method which comprises mixing a mineral acid with a mixture of an aqueous alkali solution of lignin and a rubber latex to reduce the pH of the mixture to about 7.5 without causing precipitation of the lignin or rubber, adding the mixture to an aqueous solution of a polyvalent metallic salt to effect coprecipitation of the lignin and rubber, separating the supernatant liquid from the coprecipitated lignin-rubber, drying the lignin-rubber, subjecting the dried lignin-rubber to a heat treatment at a temperature in excess of 300° F., and compounding and curing the heat treated lignin-rubber.

References Cited by the Examiner

FOREIGN PATENTS 781,019   8/1957   Great Britain.

OTHER REFERENCES

Brauns: The Chemistry of Lignin, 1952, Academic Press Inc., New York, pages 90–92, 416.

WILLIAM H. SHORT, *Primary Examiner.*

MILTON STERMAN, *Examiner.*

J. ZIEGLER, *Assistant Examiner.*